United States Patent [19]

Lin

[11] 4,184,845
[45] Jan. 22, 1980

[54] PROCESS FOR REDUCTION OF LIGNIN COLOR

[75] Inventor: Stephen Y. Lin, Mt. Pleasant, S.C.

[73] Assignee: Westvaco Corporation, New York, N.Y.

[21] Appl. No.: 569,560

[22] Filed: Apr. 18, 1975

[51] Int. Cl.$^2$ ............................ C09B 9/00; C07G 1/00
[52] U.S. Cl. ................................................ 8/34; 8/83; 8/89 R; 8/93; 8/173; 260/124; 260/124 R; 260/124 B
[58] Field of Search .................. 8/89, 34, 83, 89 R, 8/93; 260/124 A, 124 R, 124

[56] References Cited

U.S. PATENT DOCUMENTS

| | | | |
|---|---|---|---|
| 3,672,817 | 6/1972 | Falkehag | 8/79 |
| 3,763,139 | 10/1973 | Falkehag | 260/124 R |
| 3,769,272 | 10/1973 | Hintz | 260/124 R |
| 3,865,803 | 2/1975 | Falkehag | 260/124 A |
| 4,001,202 | 1/1977 | Dilling et al. | 8/34 |

OTHER PUBLICATIONS

Imsgard et al., Tappi, 1971, 54 (No. 10), pp. 1680-1684.
Brauns, F. E., "The Chemistry of Lignin", (Academic Press, New York-1952), pp. 303, 538, 541, 549.
Brauns, F. E. and Brauns, D. A., "The Chemistry of Lignin-Supplement Volume", (Academic Press, New York, 1960), pp. 507-510, 513-591.

*Primary Examiner*—A. Lionel Clingman
*Attorney, Agent, or Firm*—Ernest B. Lipscomb, III; Terry B. McDaniel

[57] ABSTRACT

Disclosed herein is a two-step process for reducing the color of sulfonated alkali lignins and lignosulfonates by at least 80% which comprises, blocking at least 90% of the free-phenolic hydroxyl groups in the lignin and then subjecting the blocked lignins to oxidative action by air, molecular oxygen or hydrogen peroxide. The thus treated lignins are useful as dispersants for disperse dyes and vat dyes.

7 Claims, No Drawings

PROCESS FOR REDUCTION OF LIGNIN COLOR

BACKGROUND OF THE INVENTION

(1) Field of the Invention

This invention relates to reducing the color of lignin. More particularly, this invention relates to a two-step process for reducing the color of lignin by first blocking the phenolic hydroxyl and then oxidizing the blocked lignin.

Lignin in wood is almost colorless. Lignin isolation procedures and pulping processes invariably introduce a variety of chromophores into the structure and render the isolated lignins strongly colored. Industrial lignins (such as sulfonated alkali lignins from the kraft and soda pulping processes and lignosulfonates from the sulfite pulping process) are colored to different degrees depending on the pulping conditions and the type of pulping process employed for delignification. The drastic conditions of a pulping process, e.g., high temperature and strong caustic in combination with atmospheric oxygen, produce lignin so intensively darkened that their uses in many application areas become objectionable because of the color.

The problem of lignin color is quite predominate in application areas where lignin is absorbed onto a substrate. Thus, for example, if lignin is used as a dispersant for dyestuff, it is usually ball-milled with a dye cake and the mixture then used for dyeing natural or synthetic fibers. One of the major disadvantages and undesirable effects of lignosulfonates and sulfonated alkali lignins as dyestuff dispersants is the staining of fabric fibers of which the degree is greatly dependent on the color of lignin. This so-called fiber staining caused by lignin tends to distort the authentic color of dye on the fabric.

The causes for the dark brown color of industrial lignins and the mechanisms for the formation of chromophores during the pulping processes are not completely known, although numerous suggestions have been made previously. For example, Gierer in Sv. Papperstidn 73 (1970) p. 561 proposed o,p'-stilbenequinone, p,p'-stilbenequinone, 1,4-bis-(p-hydroxyphenyl)-buta-1,3-diene, o-benzoquinone and methylene quinone as possible chromophoric structures. Kringstad et al. in TAPPI 54 (1971) p. 1680 estimated the amount of o-quinonoid structures in spruce milled-wood lignin to be about 0.7% and stated that the amount of quinonoid structures can account for as much as 35-60% of the light absorption of the lignin at 457 nm. The majority of chromophoric structures in alkali lignins and lignosulfonates appear to be some sort of conjugated systems involving quinonoid and side-chain double bonds.

(2) The Prior Art

The aforementioned conjugated systems may be cleaved by some oxidative processes or saturated by reductive processes to achieve some reduction of lignin color. Reductive processes change quinones to colorless catecholic structures which, however, are not stable under the influence of oxygen (air) and sunlight.

On the other hand, oxidative processes convert quinonoid structures to colorless aliphatic acids. The oxidative process also causes cleavage of unsaturated carbon-carbon bonds in the propanoid side chains of lignin molecules. By doing so, some extensively conjugated systems (chromophores) are destroyed, resulting in some reduction of lignin color. An advantage of the oxidative process is the fact that colorless end-products in oxidation reactions are stable and chromophores are not reformed thereof. However, uncontrolled oxidative conditions invite random destruction of lignin aromaticity and concurrently give rise to the formation of color bodies. For example, colored quinonoid moieties are produced in lignin by the following oxidative demethylation pathway:

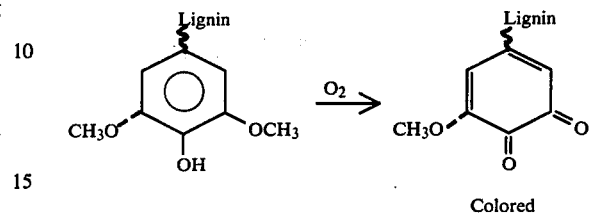

It is also known that the color of lignin may be lightened to some degree by blocking the free-phenolic of hydroxyl in lignin. Several blocking methods have been set forth, such as in U.S. Pat. No. 3,672,817 wherein the lignin color was reduced as much as 44% by blocking the phenolic hydroxyl with an alkylene oxide or a halogen-containing alkyl alcohol. In U.S. Pat. No. 3,763,139, lignin color was reduced by blocking the phenolic hydroxyl with reagents, such as chloromethesulfonate, chloromethane phosphonate, 2-chloroethanol and the like. In U.S. Pat. No. 3,769,272, lignin color was reduced by blocking with 3-chloro-2-hydroxypropane-1-sulfonate. And in U.S. Pat. No. 3,865,803, the phenolic hydroxyl was blocked with an agent of the type $X(CH_2)_nY$, wherein X is a halogen, an activated double bond, an epoxide ring or a halohydrin, Y is a sulfonate, phosphonate, hydroxyl, sulfide or a secondary or tertiary amine and n is an integer from 1 to 5.

Although each of the described methods for some reduction of the color of an alkali lignin or lignosulfonate, none have reduced the color to a sufficiently desirable extent or to the extent of the process of this invention.

It is thus the general object of this invention to provide a two-step process whereby the color of sulfonated alkali lignins and lignosulfonates are drastically reduced.

Another object of this invention is to provide light colored lignin dyestuff dispersants which are practically non-staining on fabric.

Other objects, features and advantages of this invention will be seen in the following detailed description of the invention.

SUMMARY OF THE INVENTION

It has been found that the extent of lignin color by the oxidative process may be maximized if the oxidative discoloration of lignin is minimized through first blocking of phenolic groups in lignin. Thus, the process of this invention comprises the steps of first treating lignins (sulfonated alkali lignins and lignosulfonates) with blocking agents to achieve at least a degree of blocking of 90%, and then oxidizing the blocked lignin with air, molecular oxygen or hydrogen peroxide. The color of lignin was reduced by over 80%. The light colored sulfonated alkali lignins and lignosulfonates are useful as dispersants for dyestuffs having as low as 20% of the fiber staining capacity of the prior art products.

DETAILED DESCRIPTION OF THE INVENTION

The lignins employed in the process of this invention include alkali lignins from the kraft pulping process and lignins derived from other alkaline processes, such as the soda or modified soda processes, sulfonated lignins, such as sulfite lignins from acid and neutral processes and sulfonated alkali lignins. One of the main sources of lignin is the residual pulping liquors of the pulp industry where lignocellulosic materials, such as wood, straw, corn stalks, bagasse and the like, are processed to separate the cellulose or pulp from the lignin. For example, the black liquor obtained from the kraft, soda and other alkali processes is not recovered as a sulfonated product but may easily be sulfonated, if desired, by reacting the product with a bisulfite or sulfite. In the sulfite pulping process, the lignocellulosic material is digested with a bisulfite or sulfite to obtain a sulfonated residual pulping liquor wherein the sulfonated lignin is dissolved. Likewise, lignin known as "hydrolysis lignin" obtained from the hydrolysis of lignocellulosic materials in manufacturing wood sugars, or "hydrotropic lignins" derived from hydrotropic pulping processes may be sulfonated and used.

By the term "sulfonated lignin," it is meant any lignin containing at least an effective amount of sulfonate groups to solubilize the lignin in water at neutral or acid conditions. Any of the sulfonated lignins may contain up to one-half of the other materials, such as carbohydrates, phenols and other organic and inorganic compounds. The presence of these other materials results in larger consumption of the blocking agents used to form the adduct; therefore, some purification of the lignin starting materials is often desirable. The non-sulfonated lignin materials may be removed by various known methods. Since the chemical structure of lignin varies according to its source and treatment, the following symbol containing guaiacyl or syringyl units will be used herein to represent both alkali lignin and sulfonated lignin from whatever source. The degree of sulfonation present in the lignin is not a controlling factor in making the blocked lignin but may be used to tailor the lignin to have desired characteristics.

The main technical problem in reducing lignin color by an oxidative process is how to minimize the concurrent formation of chromophores due to demethylation of lignin. It is widely acknowledged that the oxidative demethylation, such as in photochemical discoloration of lignin or in an alkaline-oxygen process, requires free-phenolic groups for the initiation of phenoxy radicals which in turn reacts with hydroxy radicals to form catecholic intermediates. The catecholic structures are then oxidized to colored quinonoid moieties as follows:

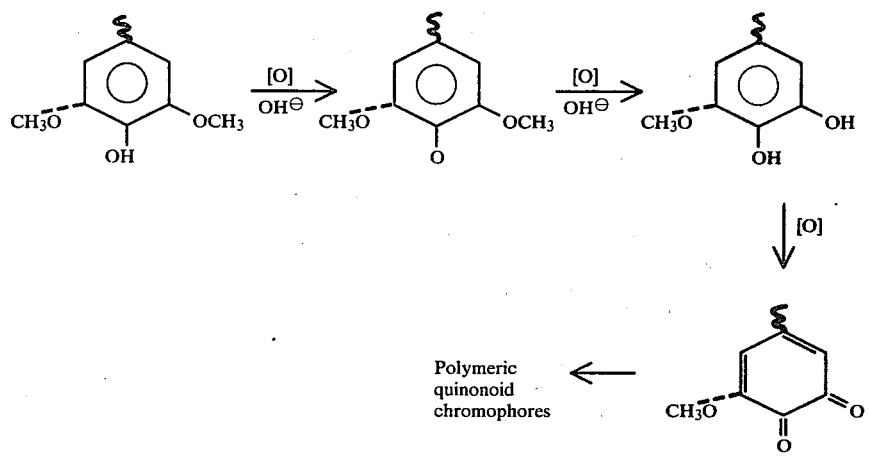

In the above sequence of reactions leading to the formation of colored bodies, it has been found that, in order to minimize the formation of phenoxy radicals, the free-phenolic groups in lignin have to be "blocked." Blocking reactions include those reactions which afford an adduct of phenolic anion and an electrophile, thus rendering the phenolic groups "blocked" and nonionizable in alkaline media.

Some useful blocking reactions are mentioned in U.S. Pat. Nos. 3,672,817, 3,763,139, 3,769,272 and 3,865,803. These patents specify the use of alkylene oxide, halogen-containing alkyl alcohol, halogen-containing alkyl sulfonate or alkylene carbonate and others as the blocking reagents; and these patents are incorporated herein by reference. Other phenol blocking reagents which perform equally well include, typical etherization reagents such as diazomethane, dimethyl sulfate and alkyl iodide, and esterization reagents such as benzoyl chloride and acetic anhydride. Although these blocking agents dramatically reduce the color of lignin, even the best performing blocking agent can only reduce the color about 50%.

In the first step of the process, the lignin is reacted with from about 1 to 20 moles, preferably about 2 to 10 moles, per 1,000 grams of lignin of the blocking reagent. The blocking step is made by simply dissolving the lignin in water and intermixing a given amount of blocking agent and reacting at a temperature between about 0° C. and 200° C. until at least 90% of the phenolic hydroxyl is blocked. A catalyst, such as sodium hydroxide may be used if desired but is not necessary. The preferred temperature will depend upon the particular blocking agent used. For example, with chloromethane sulfonate, the reaction takes place best at temperatures between 160° C. and 180° C. and with propylene oxide a temperature between about 90° C. and 110° C. appears best.

The second step in the process of reducing lignin color involves oxidation of a blocked lignin with oxidants chosen from the group of air, oxygen and hydrogen peroxide. To achieve the best color reduction, the blocked lignin should be subjected to the oxidation at an oxygen or air pressure of 50 to 200 p.s.i., oxidation temperature of 50° C. to 150° C. and duration of oxidation ranging from 5 minutes to 2 hours. The preferred oxidation parameters, however, are 100 p.s.i., 90° C. and 0.5 hours. The initial pH of blocked lignin solution should be from approximately 10 to 12.5, but preferably 11.0.

Alternatively, in the oxidation of lignin with hydrogen peroxide, the lignin solution should be adjusted to pH 7.0 to 11.0, but the best results are obtained at pH 9.0. The amount of hydrogen peroxide used ranges from 1 to 6 moles per 1,000 grams of blocked lignin.

In all cases of oxidations, whether by air, molecular oxygen or by hydrogen peroxide, a good mixing of the blocked-lignin solution is essential to achieving the best results. Localization of the oxidants in the blocked-lignin solution, particularly important in the case of reactive hydrogen peroxide, should be avoided or only a portion of the lignin solution is subjected to extensive oxidation (due to a large oxidant/lignin ratio); whereas, the other portion does not have the opportunity to be in contact with the oxidant. This will certainly result in non-uniform lignin products and, moreover, the color reduction is not maximized with the amount of oxidant used. By "non-uniform" it is meant that a part of the lignin sample is oxidized more extensively than the other.

Under certain optimal oxidation conditions, admittedly the color of an "unblocked" lignin sample can also be reduced by the oxidative method; but the magnitude of color reduction is quite limited (usually less than 30% when lignin is oxidized in an aqueous solution). Furthermore, "unblocked" lignins are extremely sensitive to the variation of temperature and pH of the lignin solutions during oxidation. Again, the reason for the difference (between "blocked" and "unblocked" lignins) is that "unblocked" lignin is oxidized to chromophores or colorless products; the rate of formation for either of the two types of structures varies depending on the oxidation conditions. In the case of "blocked" lignin, the formation of color bodies is prevented or minimized by blocking of phenolic groups; whereas, chromophores are still subjected to destruction by oxidants. Because of the lower oxidative potential of quinonoid or other chromophores in comparison with quaiacyl or syringyl units (lignin building units), mild oxidation conditions are capable of destroying the color bodies; but severe conditions are usually required to degrade the lignin building units.

The practice of this invention may be better understood in the following detailed examples.

EXAMPLE 1

This example illustrates the process of the invention by showing the effect of blocking and oxidation on color compared to non-blocked and oxidized lignins. One hundred grams of a sulfonated kraft lignin, REAX ® 80C from Westvaco Corporation, were dissolved in 400 grams of water and adjusted to pH 10.5 with 50% NaOH. The mixture was placed in a 2-liter autoclave with 11.6 grams of propylene oxide (or 2 moles per 1,000 g. lignin). The temperature was increased to 100° C.; and after 1 hour, the pH of the solution became 12.0. The solution was taken out of the autoclave and adjusted to pH 10.5 with conc. HCl. More propylene oxide (11.6 g.) was added and the mixture was cooked as before at 100° C. for 1 hour. This procedure was repeated until over 90% of the free-phenolic groups are blocked. A number of propylene oxide blocked lignins were made and the light absorption at 500 nm. measured.

The blocked lignins were then oxidized with oxygen in the following manner: 20 grams of blocked lignin were dissolved in approximately 400 grams of water and adjusted to pH 12.5 with 50% NaOH. The solution was placed in a 2-liter autoclave into which was then applied an oxygen pressure of 200 p.s.i. The reactor and lignin solution were heated at 140° C. for 1 hour. The blocked-oxidized product was spray dried and the light absorption again measured. The light absorption of a lignin sample was corrected for non-lignin contaminants and expressed as absorbence in liter per centimeter per gram (or $D_{500}$). The results are shown in Table I.

TABLE I

EFFECTS OF DEGREE OF BLOCKING AND OXIDATION ON COLOR

| Sample No. | Treatment of Sulfonated Kraft Lignin | % Phenolic OH[1] Present | $D_{500}$ | %, $D_{500}$ |
|---|---|---|---|---|
| — | Untreated | 100 | 0.270 | 100 |
| A-1 | Blocked only | 53 | 0.250 | 93 |
| A-2 | Oxidized and blocked | — | 0.120 | 44 |
| B-1 | Blocked only | 24 | 0.204 | 76 |
| B-2 | Oxidized and blocked | — | 0.108 | 40 |
| C-1 | Blocked only | 6 | 0.197 | 73 |
| C-2 | Oxidized and blocked | nil | 0.05 | 18 |

Note:
[1] % phenolic OH was determined by alkaline ionization spectrometric method, and assumed 100 for starting lignin.

These results show that when the phenolic hydroxyl is at least 90% blocked, i.e., sample C-1, upon subsequent oxidation at least 80% of the color is eliminated, i.e., sample C-2.

EXAMPLE 2

The products of Example 1 were tested for fiber staining. The test was as follows and the results are shown in Table II. The test for determining the extent of fiber staining caused by lignosulfonate dyestuff dispersants was to weigh out 20 grams of the lignin product and dissolve in 500 ml. of tap water, adjust the pH to 7.0 with 0.5 N HCl, and heat the solution to boiling temperature. Five swatches of cotton cloth were added to the boiling solution and staining began for 10 minutes at a stirring rate of about 100 RPM. At the end of the staining period, the lignin solution was poured off and the swatches were squeezed out by hand and placed in a beaker. The swatches were rinsed with cold tap water for 5 minutes and dried in a home dryer for 30 minutes. For a blank experiment, no lignin was added in the staining cycle. The reflectance of the swatches was measured on a brightness meter and the staining index (I) of the lignin product calculated by the following formula: $I(\%) = (R_o - R_i)/R_o$ where $R_o$ = reflectance of blank swatches; and $R_i$ = reflectance of stained swatches.

TABLE II
EFFECTS OF BLOCKING AND OXIDATION ON FIBER STAINING OF LIGNIN

| Sample No. from Example 1 | Staining Index (I) % | % I |
|---|---|---|
|  | 18.6 | 100 |
| A-1 | 16.1 | 87 |
| A-2 | 8.4 | 45 |
| B-1 | 12.0 | 64 |
| B-2 | 6.7 | 36 |
| C-1 | 11.4 | 61 |
| C-2 | 3.9 | 21 |

These results show that the blocked and subsequently oxidized lignins have reduced fiber staining.

EXAMPLE 3

This example illustrates the effect of oxidation temperature on the color of "unblocked" lignin. A highly sulfonated kraft lignin, REAX® 85A from Westvaco Corporation, was oxidized with oxygen (200 p.s.i.) at temperatures varying from 30° C. to 170° C. for 1 hour. The pH of the lignin solution was adjusted to 10.0 before oxidation. The color was measured at 500 nm. and expressed as absorbence at a lignin concentration of one gram per liter and the results shown in Table III.

TABLE III
EFFECT OF OXIDATION TEMPERATURE ON COLOR OF "UNBLOCKED" LIGNIN

| Sample No. | Oxidation Temperature | Color Values $D_{500}$ | Color Reduction[1], % |
|---|---|---|---|
| Untreated | — | 0.364 | 0 |
| Oxidized |  |  |  |
| 1 | 30° C. | 0.360 | +1.1 |
| 2 | 50° C. | 0.323 | +11.2 |
| 3 | 70° C. | 0.312 | +14.3 |
| 4 | 90° C. | 0.293 | +19.5 |
| 5 | 110° C. | 0.301 | +17.3 |
| 6 | 140° C. | 0.467 | −28.4 |
| 7 | 170° C. | 0.712 | −95.6 |

Note:
[1] + = color reduction; − = color increase.

The results indicate that: (1) a color reduction is achieved by oxidation of "unblocked" lignin at temperatures below 110° C., with 90° C. being the optimal temperature, and (2) oxidation temperature above 140° C. greatly accelerates the formation of chromophores and the oxidized lignosulfonate becomes darker than before oxidation. On the contrary, the color of "blocked" lignin is not sensitive to the oxidation temperature. For example, a "blocked" lignosulfonate, after oxidation at 70° C. and 140° C. gives color values ($D_{500}$) of 0.120 and 0.114, respectively (before oxidation, $D_{500}=0.197$). Moreover, no darkening effect has been experienced in the oxidation of "blocked" lignins.

EXAMPLE 4

This example illustrates blocking with another blocking agent, dimethyl sulfate, and oxidizing with air.

One hundred grams of a sulfonated kraft lignin were dissolved in 400 grams of water and adjusted to pH 11.0 with 50% NaOH in a 2-liter three-necked flask equipped with a mechanical stirrer, a thermometer and a 125 ml. dropping funnel. While the lignin solution was under stirring, 23.2 grams of dimethyl sulfate (2 moles per 1,000 g. lignin) were added dropwise and the temperatures maintained at approximately 50° C. When the addition was complete, the mixture was maintained at the temperature for 10 minutes. Then the pH of the mixture was readjusted to 11.0 with concentrated NaOH and 23.2 grams of dimethyl sulfate added as before. Stirring continued for 30 minutes. Repeat the addition of dimethyl sulfate until blocked lignins of desired phenolic content were produced as determined by alkaline ionization spectra of the products. The end products were separated from inorganic by precipitation, and evaluated for their staining capacity and color values as in Example 1.

Oxidation of the blocked samples was carried out with air at 90° C. and a pH of 11.0 for 2 hours. The results of evaluation of the blocked and subsequently oxidized samples for color and fiber staining are shown in Table IV.

TABLE IV
EFFECTS OF BLOCKING AND OXIDATION ON COLOR AND FIBER STAINING OF LIGNIN

| Sample No. | Highly Sulfonated Kraft Lignin | % Phenolic OH[1] | $D_{500}$ | % $D_{500}$ | Staining Index (I) % | % I |
|---|---|---|---|---|---|---|
|  | Untreated | 100 | 0.270 | 100 | 18.6 | 100 |
| A-1 | Blocked | 64 | 0.261 | 97 | 17.5 | 94 |
| A-2 | Oxidized and blocked | — | 0.135 | 50 | 9.4 | 50 |
| B-1 | Blocked | 28 | 0.212 | 78 | 14.0 | 75 |
| B-2 | Oxidized and blocked | — | 0.109 | 40 | 7.6 | 41 |
| C-1 | Blocked | 4 | 0.200 | 74 | 13.7 | 74 |
| C-2 | Oxidized and Blocked | — | 0.035 | 13 | 3.2 | 17 |

Note:
[1] % phenolic OH was determined by alkaline ionization spectrometric method, and assumed 100 for starting lignin.

The results show that various blocking reagents and oxidants may be used.

EXAMPLE 5

The kraft sulfonated lignin prepared according to Example 1 [C-2] was evaluated as a dye dispersant using other tests.

Foaming Properties.—One gram of the dispersant was weighed out and dissolved in 100 ml. of tap water, adjusted to pH 9.5 or 7 with acetic acid and poured into a 250 ml. graduated cylinder; rapidly inverted 5 times and measured the height of the foam in ml. immediately after completing the inversion and measured again after 1 minute and 2 minutes had elapsed. If the foam disappeared within 1 minute, note the time at which all the foam vanished.

Diazo Dye Reduction.—Two Hundred Fifty milligrams of Disperse Brown 1 dye were dispersed in 200 ml. of distilled water. Ten grams of a modified sulfonated lignin dispersant were added. The mixture was thoroughly stirred and the pH adjusted to 6.0 with acetic acid. Five 4"×6" polyester-cotton blend (65/35) swatches were placed with the dye mixture in a 2-liter sealed Parr bomb and heated at 130° C. for 1.5 hours, including time-to-temperature of 25 minutes. At the end of heating, the bomb was cooled to room temperature, the contents poured off and the swatches were squeezed out by hand and placed in a beaker. The swatches were rinsed with cold running tap water for 5 minutes and dried in a home dryer for 30 minutes.

For a blank experiment, no lignin was added to the dyeing bath. The reflectance (R) of the swatches was measured on a brightness meter at 457 mm. The average reflectance of five swatches was accepted as the value for a lignin product, and used in calculation of the Kubelka-Munk number (k/s) by the following equation:

$$k/s = (1-R)^2/2R$$

where K=light absorption coefficient; and s=light scattering coefficient. The value, k/s, was used to estimate the percent diazo dye reduction according to the following formula:

$$\% \text{ Dye Reduction} = [1 - \frac{(k/s)_i - (k/s)_o}{(k/s)_b - (k/s)_o}] \times 100$$

where $(k/s)_i$, $(k/s)_b$ and $(k/s)_o$ are the Kubelka-Munk numbers for fabric swatches after heating in a dye solution with lignin dispersants (i), without lignin (b) and undyed swatches, respectively. The results of foaming and diazo dye reduction experiments are presented in Table V.

Table V

| Lignin Product | % Diazo Dye Reduction | Foam Test, ml. of Foam[1] | | | | | |
|---|---|---|---|---|---|---|---|
| | | pH 7.0 | | | pH 9.5 | | |
| | | Init. | 1 Min. | 2 Min. | Init. | 1 Min. | 2 Min. |
| Blank | 0 | — | — | — | — | — | — |
| Example 1 [C-2] | 13 | 15(5) | 0 | 0 | 8(5) | 0 | 0 |
| REAX 90[2] | 32 | 42 | 5 | 5 | 33 | 8 | 4 |
| REAX 85A[2] | 91 | 60 | 30 | 12 | 28(10) | 0 | 0 |
| REAX 80C[2] | 87 | 80 | 12 | 8 | 33(8) | 0 | 0 |

Notes:
[1] Numbers in parenthesis represent time in seconds required for the foam to disappear completely.
[2] Westvaco lignosulfonate dispersants.

It can be seen from the data, the lignin product prepared according to Example 1 has the lowest fiber staining, diazo reduction and foaming tendencies compared with the existing commercial lignin dye dispersants.

EXAMPLE 6

To demonstrate the effect of color reduction on the fiber staining tendency of a sulfonated kraft lignin, REAX® 80C was blocked with propylene oxide to a degree of blocking of over 95%, then oxidized, according to Example 1, with various amounts of alkali in the lignin solution. After oxidation, the light absorption of the solution was measured at 500 nm. and the oxidized lignin evaluated for its fiber staining ability in the same manner as described previously. Again, the Kubelka-Munk number (k/s) was calculated from the reflectance value of stained fabric swatches and plotted against absorbence at 500 nm. (or $D_{500}$). Table VI shows the linear relationship between (k/s) and $D_{500}$, indicating the sole dependence of degree of fiber staining on the color of oxidized blocked lignins.

TABLE VI

| k/s | $D_{500}$ |
|---|---|
| 0.018 | |
| 0.021 | 0.05 |
| 0.028 | 0.08 |
| 0.028 | 0.08 |
| 0.030 | 0.11 |
| 0.045 | 0.2 |
| 0.046 | 0.2 |

While the invention has been described and illustrated herein by reference to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A two-step process for producing light colored lignin which comprises;
   (a) reacting a sulfonated alkali lignin or lignosulfonate with from 1 to 20 moles of a member selected from the group consisting of alkylene oxides, halogen-containing alkyl alcohol, alkyl sulfonate and alkylene carbonate at a temperature from 0° C. to 200° C. until at least 90% of the phenolic hydroxyl groups are blocked and thereafter,
   (b) treating said blocked lignin with an oxidant until the original color of said lignin is made lighter by at least 80%.

2. The process of claim 1 wherein said lignin is a member of the group consisting of sulfonated kraft lignin, sulfonated soda lignin and sulfite lignin.

3. The process of claim 1 wherein said blocking agent is a member of the group consisting of propylene oxide, dimethyl sulfate and chloroethanol.

4. The process of claim 1 wherein said oxidant is a member of the group consisting of air and molecular oxygen.

5. The process of claim 4 wherein said treating is carried out at a temperature from 50° C. to 150° C. at gas pressure of 50 to 200 p.s.i. for 5 minutes to 2 hours.

6. The process of claim 1 wherein said oxidant is hydrogen peroxide in amounts of 1 to 6 moles per 1,000 grams of blocked lignin and oxidizing is carried out at a pH from 7 to 11.

7. A dyestuff composition comprising a disperse or vat dye cake and from 1% to 75% by weight of said dye cake is the product produced by the process of claim 1.

* * * * *